United States Patent
Pitcher et al.

(10) Patent No.: US 9,679,590 B2
(45) Date of Patent: Jun. 13, 2017

(54) MAGNETIC DEVICES INCLUDING FILM STRUCTURES

(71) Applicant: SEAGATE TECHNOLOGY LLC, Cupertino, CA (US)

(72) Inventors: Philip G. Pitcher, Shakopee, MN (US); Sami Antrazi, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/155,656

(22) Filed: May 16, 2016

(65) Prior Publication Data
US 2016/0365103 A1 Dec. 15, 2016

Related U.S. Application Data

(63) Continuation of application No. 14/811,284, filed on Jul. 28, 2015, now Pat. No. 9,343,099, which is a (Continued)

(51) Int. Cl.
*G11B 11/00* (2006.01)
*G11B 5/31* (2006.01)
(Continued)

(52) U.S. Cl.
CPC ............ *G11B 5/314* (2013.01); *B82Y 10/00* (2013.01); *G11B 5/3106* (2013.01); *G11B 13/08* (2013.01);
(Continued)

(58) Field of Classification Search
CPC .... G11B 2005/0021; G11B 2005/0005; G11B 5/314; G11B 5/3163; G11B 13/04; G11B 13/045; G11B 13/08; B82Y 10/00
See application file for complete search history.

(56) References Cited

U.S. PATENT DOCUMENTS

| 4,492,873 A | 1/1985 | Dmitriev |
| 5,482,611 A | 1/1996 | Helmer |

(Continued)

FOREIGN PATENT DOCUMENTS

| EP | 2106678 | 10/1987 |
| EP | 0942072 | 9/1999 |

(Continued)

OTHER PUBLICATIONS

Al-Bayati et al., Junction Profiles of Sub keV Ion Implantation for Deep Sub-Quarter Micron Devices, IEEE, 2000, pp. 87-90.
(Continued)

*Primary Examiner* — Brenda Bernardi
(74) *Attorney, Agent, or Firm* — Mueting, Raasch & Gebhardt, P.A.

(57) ABSTRACT

A device including a magnetic structure, the magnetic structure having a substrate adjacent surface and a second, opposing surface, the magnetic structure having a near field transducer (NFT), wherein the NFT includes gold or an alloy thereof, and is positioned at the second surface an overcoat structure; and a film structure, the film structure positioned between the magnetic structure and the overcoat structure, the film structure having a total thickness of not greater than about 100 Å, and the film structure including: a first interfacial structure having a first and a second opposing surface; a second interfacial structure having a first and a second opposing surface; and an intermediate structure wherein the first surface of the first interfacial structure is positioned adjacent the NFT of the magnetic structure, and the second surface of the second interfacial structure is positioned adjacent the overcoat structure, and the intermediate structure is positioned between the first interfacial structure and the second interfacial structure, and wherein the first interfacial structure includes one or more rare earth elements, one
(Continued)

or more alkaline earth metals, one or more alkali metals, or a combination thereof.

19 Claims, 6 Drawing Sheets

Related U.S. Application Data continuation of application No. 14/468,383, filed on Aug. 26, 2014, now Pat. No. 9,099,146, which is a continuation of application No. 13/923,925, filed on Jun. 21, 2013, now Pat. No. 8,830,800.

(51) Int. Cl.
  *B82Y 10/00*  (2011.01)
  *G11B 13/08*  (2006.01)
  *G11B 5/00*   (2006.01)

(52) U.S. Cl.
  CPC ... *G11B 2005/0021* (2013.01); *Y10S 977/943* (2013.01)

(56) References Cited

U.S. PATENT DOCUMENTS

| | | |
|---|---|---|
| 5,849,093 A | 12/1998 | Andra |
| 5,945,681 A | 8/1999 | Tokiguchi |
| 6,130,436 A | 10/2000 | Renau |
| 6,589,676 B1 | 7/2003 | Gui |
| 6,632,483 B1 | 10/2003 | Callegari |
| 6,641,932 B1 | 11/2003 | Xu |
| 6,683,426 B1 | 1/2004 | Kleeven |
| 6,839,191 B2 | 1/2005 | Sugiura |
| 7,377,228 B2 | 5/2008 | Mack |
| 7,476,855 B2 | 1/2009 | Huang |
| 8,077,559 B1 | 12/2011 | Miyauchi |
| 8,325,567 B2 | 12/2012 | Miyauchi |
| 8,351,151 B2 | 1/2013 | Katine |
| 8,351,307 B1 | 1/2013 | Wolf |
| 2005/0012052 A1 | 1/2005 | Platzgummer |
| 2006/0238133 A1 | 10/2006 | Horsky |
| 2008/0230724 A1 | 9/2008 | Low |
| 2010/0061199 A1 | 3/2010 | Hirara |
| 2010/0123965 A1 | 5/2010 | Lee |
| 2010/0123967 A1 | 5/2010 | Batra |
| 2010/0190036 A1 | 7/2010 | Komvopoulos |
| 2010/0320403 A1 | 12/2010 | Amaldi |
| 2011/0006214 A1 | 1/2011 | Bonig |
| 2011/0026161 A1 | 2/2011 | Ikeda |
| 2011/0205863 A1 | 8/2011 | Zhao |
| 2011/0294398 A1 | 12/2011 | Hu |
| 2011/0317528 A1 | 12/2011 | Miyauchi |
| 2012/0045662 A1 | 2/2012 | Zou |
| 2013/0161505 A1 | 6/2013 | Pitcher |
| 2013/0164453 A1 | 6/2013 | Pitcher |
| 2013/0164454 A1 | 6/2013 | Pitcher |
| 2013/0330573 A1 | 12/2013 | Zhao |
| 2014/0113160 A1 | 4/2014 | Pitcher |
| 2014/0204723 A1 | 7/2014 | Shimazawa |
| 2014/0269237 A1 | 9/2014 | Sasaki |

FOREIGN PATENT DOCUMENTS

| | | |
|---|---|---|
| EP | 1328027 | 7/2003 |
| WO | WO 97/45834 | 12/1997 |

OTHER PUBLICATIONS

Angel et al., "Enhanced Low Energy Drift-Mode Beam Currents in a High Current Ion Implanter," IEEE, 1999, pp. 219-222.
Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.

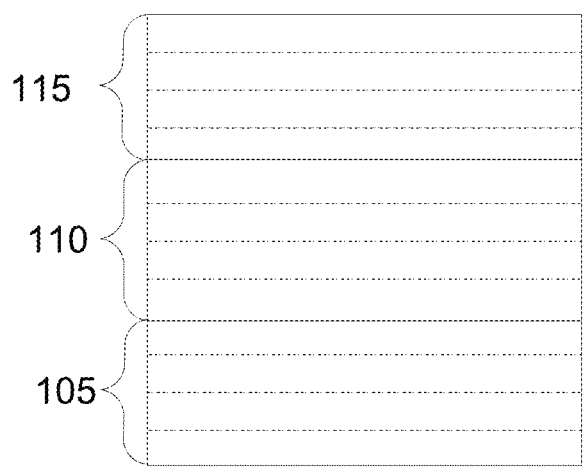
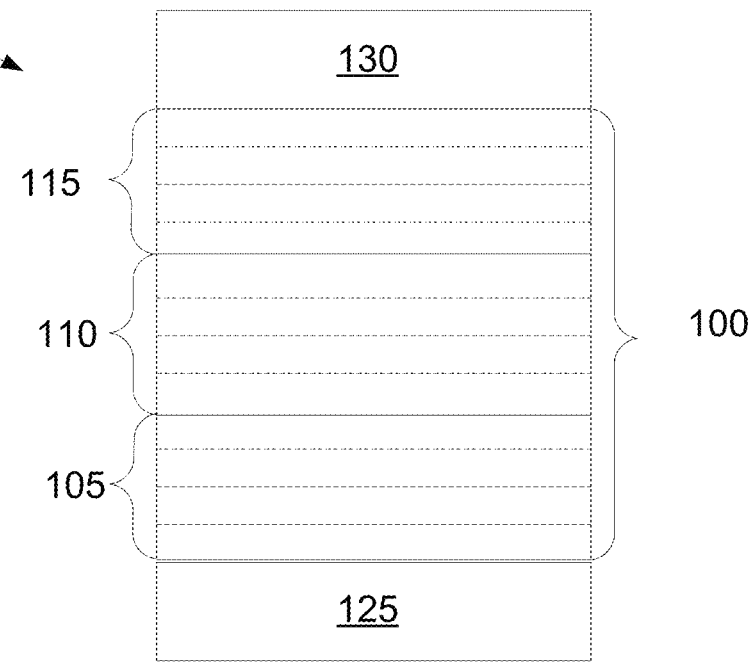

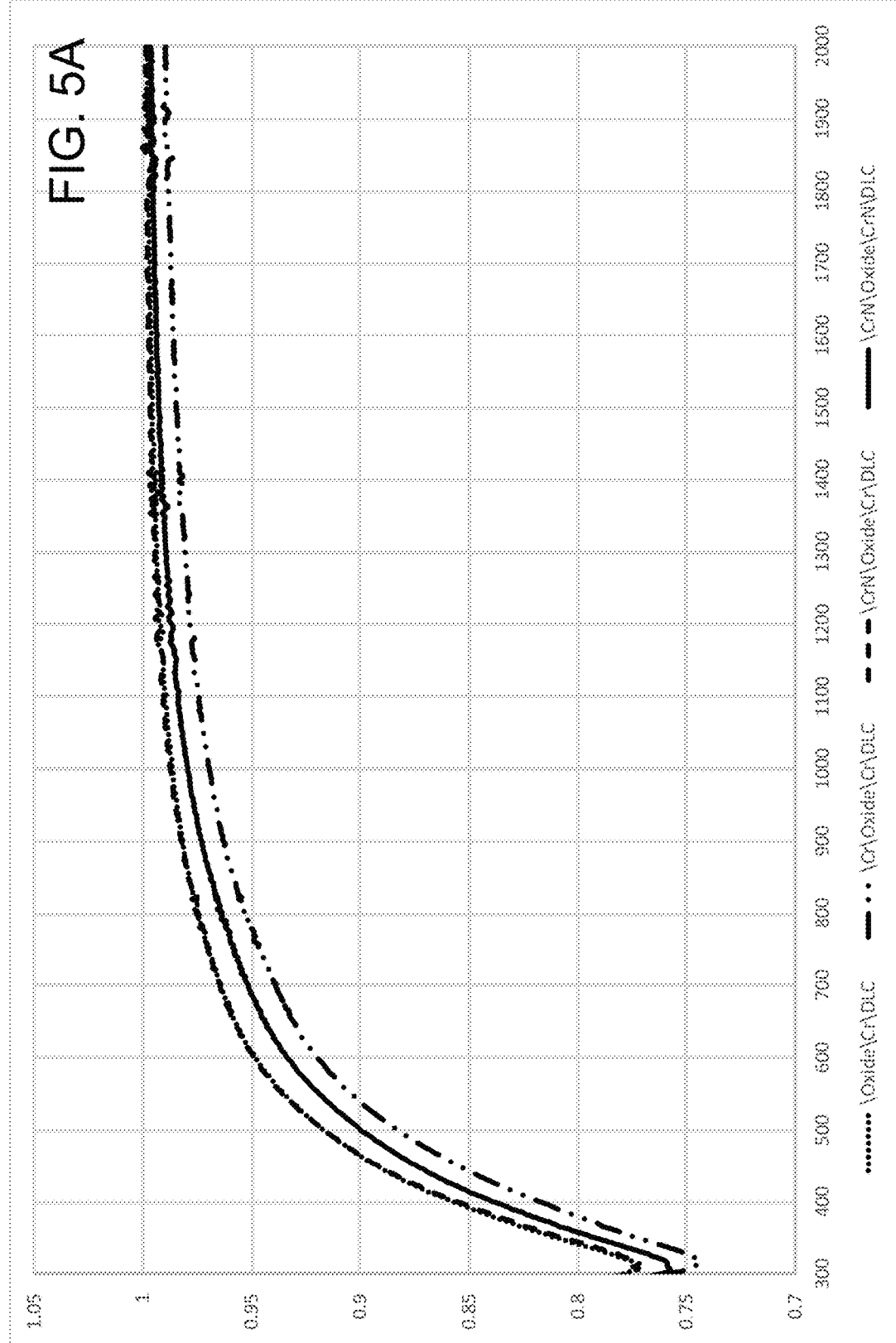

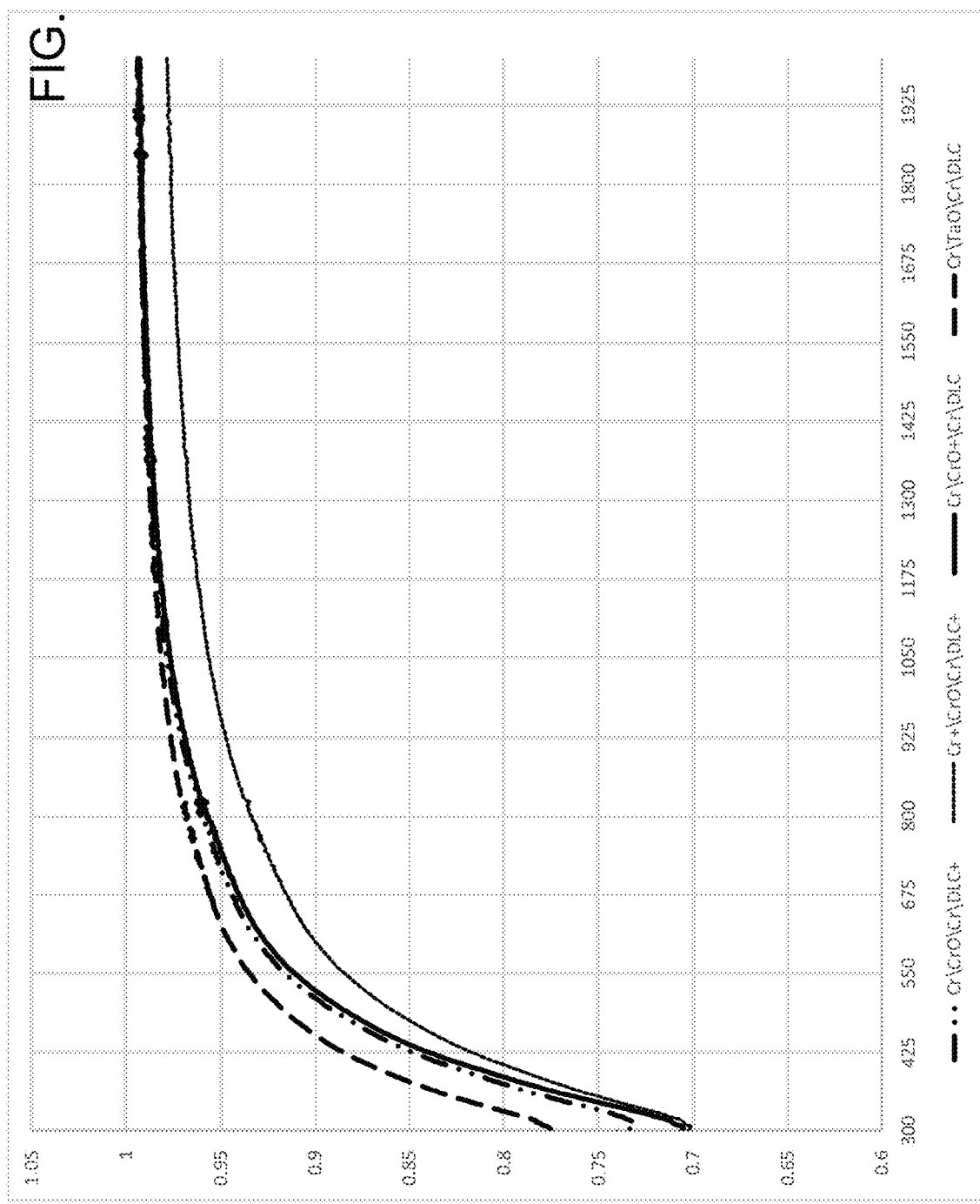

MAGNETIC DEVICES INCLUDING FILM STRUCTURES

BACKGROUND

Overcoats in rotating disk perpendicular or longitudinal data storage applications are a challenging technology requiring management of materials properties on the nanoscale. In the past, overcoat technology included a simple, layer of carbon and an adhesion layer. Such simple structures are no longer able to address concerns of new technologies.

In emerging leading edge storage technologies such as heat assisted magnetic recording (HAMR), additional requirements for overcoat film characteristics include high thermal resiliency, control of optical characteristics (of bulk materials and interfaces) and thermal management. Management of the interface between the underlying transducer structure and overcoat system is of even greater importance due to the more demanding, higher temperatures experienced and the requirements of new plasmonic materials systems in the transducer structure. Simple overcoat/adhesion layer structures, as used in contemporary perpendicular storage transducer technology, cannot accommodate the increased requirements for film functionality in HAMR and may have limited extendibility in perpendicular data storage.

SUMMARY

A device including a magnetic structure, the magnetic structure having a substrate adjacent surface and a second, opposing surface, the magnetic structure having a near field transducer (NFT), wherein the NFT includes gold or an alloy thereof, and is positioned at the second surface an overcoat structure; and a film structure, the film structure positioned between the magnetic structure and the overcoat structure, the film structure having a total thickness of not greater than about 100 Å, and the film structure including: a first interfacial structure having a first and a second opposing surface; a second interfacial structure having a first and a second opposing surface; and an intermediate structure wherein the first surface of the first interfacial structure is positioned adjacent the NFT of the magnetic structure, and the second surface of the second interfacial structure is positioned adjacent the overcoat structure, and the intermediate structure is positioned between the first interfacial structure and the second interfacial structure, and wherein the first interfacial structure includes one or more rare earth elements, one or more alkaline earth metals, one or more alkali metals, or a combination thereof.

A device comprising a magnetic structure, the magnetic structure having a substrate adjacent surface and a second, opposing surface, the magnetic structure including a near field transducer (NFT), wherein the NFT includes gold or an alloy thereof is positioned at the second surface an overcoat structure; and a film structure, the film structure positioned between the magnetic structure and the overcoat structure, the film structure having a total thickness of not greater than about 100 Å, and the film structure including: a first interfacial structure having a first and a second opposing surface; a second interfacial structure having a first and a second opposing surface; and an intermediate structure wherein the first surface of the first interfacial structure is positioned adjacent the NFT of the magnetic structure, and the second surface of the second interfacial structure is positioned adjacent the overcoat structure, and the intermediate structure is positioned between the first interfacial structure and the second interfacial structure, and wherein the first interfacial structure has a thickness from about 2 Å to about 50 Å and has at least one layer including one or more rare earth elements, one or more alkaline earth metals, one or more alkali metals, or a combination thereof.

A device including a magnetic structure, the magnetic structure having a substrate adjacent surface and a second, opposing surface, the magnetic structure including a near field transducer (NFT) including a plasmonic material, wherein the NFT is positioned at the second surface; an overcoat structure; and a film structure, the film structure positioned between the magnetic structure and the overcoat structure, the film structure having a total thickness of not greater than about 100 Å, and the film structure including a first interfacial structure having a first and a second opposing surface; a second interfacial structure having a first and a second opposing surface; and an intermediate structure wherein the first surface of the first interfacial structure is positioned adjacent the NFT of the magnetic structure, and the second surface of the second interfacial structure is positioned adjacent the overcoat structure, and the intermediate structure is positioned between the first interfacial structure and the second interfacial structure, and wherein the first interfacial structure includes one or more microalloy dopants, wherein the microalloy dopants suppress or reduce atom and/or defect mobility or diffusion of the plasmonic material of the NFT.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIG. 1 is a schematic depiction of a disclosed film structure.

FIG. 2 is a schematic depiction of a disclosed film structure in an article.

FIGS. 5A and 5B are graphs showing the optical transmission characteristics of various film structures as a function of wavelength (UV-VIS-NIR).

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 3A:
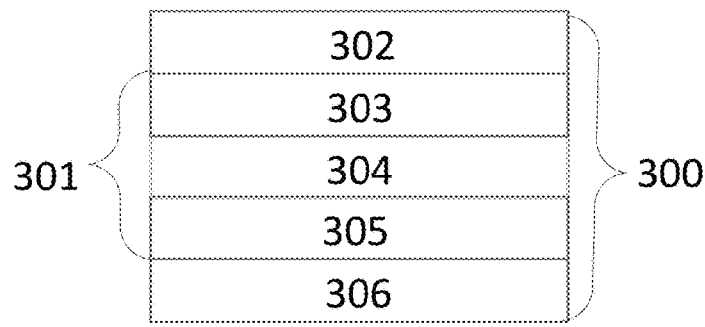
FIGS. 3A, 3B, 3C, 3D, 3E, and 3F are schematic depictions of more specifically described exemplary articles including film structures.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed herein are film structures and articles including film structures. Disclosed film structures can also be described as systems of integrated stacks of films and associated interfaces that can promote desired characteristics of structures over- and underlying them. The film structures can also be described as functioning to integrate, in desirable ways, an overlying structure with an underlying structure. For example, chemical, mechanical and thermal stability of an overcoat; chemical, mechanical and thermal stability of materials of underlying structures (including for example maintaining the function of plasmonic materials of transducers, and preventing corrosion of magnetic materials of readers and writers, and other integrated structures), management of optical and thermal characteristics of the overcoat-transducer interface, or combinations thereof, in advanced data storage technologies can all be considered in designing a disclosed film structure.

Disclosed film structures may provide various benefits. Exemplary benefits can include, for example, enhancing the adherence of one layer to another; diminishing or eliminating diffusion of components within layers or from one external structure (or device) to another; providing a surface that is compatible with later processing techniques; providing a surface that may enhance mechanical, thermal, optical, chemical (for example corrosion), or combinations of such properties of adjacent layers, or external structures; reducing or suppressing surface or interfacial mobility (i.e. diffusion) of atoms or defects (e.g. point defects such as vacancies or interstitials or line defects such as dislocations); reducing or suppressing grain boundary migration velocity or bulk matter migration; altering the surface stress; altering the interfacial surface free energy; altering the surface tension; reducing or suppressing NFT recession or protrusion; and combinations thereof.

Disclosed film structures can be utilized in various applications. An example of an application in which disclosed film structures can be useful can include articles and devices that include magnetic structures. Devices including magnetic structures can also include overcoats. Overcoats can be utilized along with magnetic structures in order to protect the magnetic structure from wear and tear, environmental affects, or combinations thereof for example. Overcoats, as the name would imply are often coated over the magnetic structure. Methods of forming overcoats, the overcoats themselves, or both can be sensitive to the nature of the underlying substrate surface. The "top" surface of magnetic structures, for example magnetic transducers, can include many different materials all of which may independently be conductive, semiconductive, or insulating.

Properties of Overall Film Structure

Disclosed film structures can provide a ubiquitous structure that can provide various beneficial properties, such as promoting adhesion, promoting consistent overcoat properties over the surface, providing a non-electrically shunting layer (if necessary) over the magnetic structures, or some combination thereof. Disclosed film structures can specifically be useful when surface sub-plantation process technologies will be utilized for deposition of further layers, for example the overcoat layer. Disclosed film structures can therefore function as diffusion barriers, adherence layers, electrically insulating layers, set-up layers for layers formed thereon, or any combinations thereof.

Disclosed film structures can function as a diffusion barrier. Film structures functioning as a diffusion barrier can decrease or eliminate diffusion of atoms from one external structure to another. For example, a film structure acting as a diffusion barrier can decrease or eliminate atoms or compounds from an underlying structure (such as a magnetic structure or transducer structure) from diffusing into an overlying structure (such as an overcoat layer), atoms from an overlying structure (such as an overcoat layer) diffusing into an underlying structure (such as a magnetic structure or transducer structure), or combinations thereof. The film structure or a portion thereof can also function to decrease or eliminate atoms of film structure itself from diffusing into adjacent structures, such as the magnetic structure, the overcoat layer, or both.

Disclosed film structures can also function to increase or enhance the adherence of one external structure to another. For example, a film structure can enhance the adherence and therefore mechanical strength or integrity of an overcoat to a magnetic structure. Disclosed film structures can function to increase or enhance the adherence of one external structure to another even in circumstances where one of the external structures or both include more than one material. For example, disclosed film structures can function to increase or enhance adherence to oxide materials, metallic materials, or both. In some embodiments, the different components of the film structure can function to increase or enhance adherence to external structures above or below (or both) of the film structure.

Disclosed film structures can also function to provide a surface that is compatible with or amenable to various types of processes. For example, a film structure can provide a surface that is amenable to different kinds of deposition techniques. Specific examples of deposition techniques for which disclosed film structures can provide advantageous surfaces are surface sub-plantation techniques. Exemplary surface sub-plantation techniques can be found, for example, in commonly assigned U.S. patent application Ser. Nos. 13/440,068; 13/440,071; and 13/440,073, the disclosures of which are incorporated herein by reference to the extent that they do not contradict this disclosure.

Disclosed film structures can also function to provide enhanced or advantageous properties to layers or structures that are formed thereon. For example, when disclosed film structures are utilized as a surface upon which surface sub-plantation techniques are being used to form an additional layer or layers, the layer so formed can have advantageous properties. Examples of advantageous properties can include, for example mechanical properties such as prevention of mechanical delamination (often described as "crinking", "buckling", or "wrinkling") due to high compressive stress.

Disclosed film structures can also function to suppress or reduce recession or protrusion of the near field transducer in HAMR recording technology. This may result from the characteristics of interfaces between layers or through diffusion of certain components from a sub-layer(s) into the NFT.

Disclosed film structures can also function to provide desired electrical properties. In some embodiments, the film structures can be electrically non-conductive. For some applications it can be advantageous to have the film structures be electrically non-conductive. Such applications can include magnetic structures having magnetic readers. In embodiments where the film structure covers at least the magnetic reader of a magnetic structure, it can be advantageous that the film structure not be electrically conductive. If the film structure is electrically conductive in this situation, the film structure could act as a shunt and short out the magnetic reader. In some embodiments that include a perpendicular magnetic recording head as a magnetic structure, the film structure could be electrically non-conductive. In embodiments where it is advantageous for the film structure to be electrically non-conductive, electrically non-conductive implies that the film structure as a whole is electrically resistive enough that the magnetic component(s) of the magnetic structure have the operational characteristics enabled.

Disclosed systems may be characterized as having three, functionally integrated, groups of films or film stacks and interfaces whose overall characteristics are designed to meet desired mechanical, thermal, corrosion and optical characteristics of the overcoat-transducer interface in advanced data storage technology, for example heat assisted magnetic recording (HAMR) and perpendicular storage technologies. One component of such film stacks/interfaces can be characterized as being adjacent to an underlying transducer structure. The uppermost film stack system can be characterized as forming a part of the overcoat which is a component of the head disk interface (HDI). Finally, an intermediate group of films is situated between the overcoat and transducer component film stacks. The intermediate structure functionality may include layers and interfaces designed to achieve compatibility between the overcoat and transducer interface film stacks, that is, maintaining the required functional characteristics of these respective film stack components. The intermediate structure film stack can also have intrinsic functionality, e.g. in the thermal and optical property management of the overall integrated stack structure.

Generally, a film group can be designed in order to promote desired characteristics of structures under- and/or overlying the film structure. The specific characteristics of a film group, and concomitantly, the film or films within a film group then, can depend at least in part on the identity and functioning of the under- and/or overlying structures adjacent to the film structure. The film groups, and/or the film or films within a film group can also affect or take advantage of interfaces between adjacent films. The materials of individual films can be selected with various interface features or properties in mind as well. In some embodiments where a film structure is positioned between an overcoat and a transducer structure, the film structure can promote desired characteristics of an overcoat (corrosion and mechanical protection for example), desired characteristics of plasmonic materials within a transducer (mechanical and thermal stability for example), desired characteristics of the overcoat-transducer interface (management of optical and thermal characteristics, for example), or some combination thereof in advanced data storage technology such as HAMR technologies.

FIG. 1 depicts an example of a disclosed film structure 100. An exemplary film structure 100 can include one or more than one film groups. The exemplary film structure 100 depicted in FIG. 1 includes three film groups. Each film group can independently include one or more than one film layer. The three film groups depicted in FIG. 1 are a first interfacial structure 105, an intermediate structure 110 and a second interfacial structure 115. The intermediate structure 110 can generally be positioned between the first interfacial structure 105 and the second interfacial structure 115. The first interfacial structure 105 can be described as being on the bottom of the film structure 100 and the second interfacial structure 115 can be described as being on the top of the film structure 100.

The film structure 100 can be positioned adjacent to one or more external structures (not depicted in FIG. 1). In some embodiments, the film structure 100 can be positioned between at least two external structures. FIG. 2 illustrates an embodiment of an article including a disclosed film structure. The article 120 can include a disclosed film structure 100, an underlying structure 125 and an overlying structure 130. The film structure 100 can generally be positioned adjacent to, on, on top of, or above the underlying structure 125. It should be noted that the film structure 100 can be positioned adjacent to, on, on top of, or above a portion of the underlying structure or the entire underlying structure. The overlying structure 130 is generally positioned adjacent to, on, on top of, or above at least a portion of the film structure 100.

In some embodiments, a film structure 100 can be formed along with (or as part of a sequential processing scheme) one or more external structures. Some exemplary external structures that can be considered along with exemplified film structures include, for example, transducers such as magnetic transducers for reading and writing data on a magnetic disk and near-field transducers (NFTs) for converting light energy into thermal energy for heating a portion of a magnetic disk. Another type of external structures that can be considered along with exemplified film structures include, for example overcoats.

Generally, each of the film groups, or more specifically the first interfacial structure 105, the intermediate structure 110, and the second interfacial structure 115 can independently be composed of one film or more than one film. In situations where a film group includes more than one film, the film group itself can be described as having three regions (similar to the three film groups in the overall film structure) independently and in combination designed to provide different features depending on the over- or underlying structure it is adjacent to. The dashed lines in FIG. 1 within each film group indicate optional multiple films (from two films to a plurality of films within a film group) that can make up a single film group. Although depicted as having equal thicknesses, it should be noted that individual films within a film group need not have the same thickness.

Disclosed film structures can have total thicknesses of not greater than 200 Å. In some embodiments, film structures can have total thicknesses of not greater than 100 Å. In embodiments where film structures are to be used in articles for magnetic data storage, the maximum desired thicknesses of the film structure can be considered bounded by the desire to maintain a minimum distance between the head and adjacently flying magnetic media. In some embodiments, a film structure can be described by its overall thickness. In some embodiments, a film structure can have a thickness from 2 Å to 100 Å. In some embodiments, a film structure can have a thickness from 2 Å to 70 Å.

First Interfacial Structure

FIGS. 1 and 2 depict a first interfacial structure 105. The first interfacial structure 105 is positioned, on the bottom of the film structure 100. The first interfacial structure 105 can be designed to promote desired characteristics of an underlying structure or underlying structures. In some embodiments where the film structure is positioned adjacent a transducer, the first interfacial structure can also be referred to as a transducer interfacial structure.

The first interfacial structure 105 can be composed of a single individual film or can include more than one single individual film. In some embodiments, a first interfacial structure can be composed of a single layer; in some embodiments a first interfacial structure can be composed of at least two layers; and in some embodiments a first interfacial structure can be composed of at least three layers.

In some embodiments, a first interfacial structure can have a thickness from a partial monolayer of atoms to 50 Å. In some embodiments, a first interfacial structure can have a thickness from a monolayer of atoms to 50 Å. In some embodiments, a first interfacial structure can have a thickness from 2 Å to 50 Å. In some embodiments, a first interfacial structure can have a thickness from 2 Å to 30 Å. In some embodiments, a first interfacial structure can have a thickness from 2 Å to 20 Å.

First interfacial structures can promote desired characteristics of underlying structures, such as for example transducers. Such desired characteristics can include, for example minimizing or eliminating recession of the transducer for example a NFT by suppressing or reducing the atom and/or defect mobility or diffusion of certain components, suppressing or reducing the grain boundary migration of materials of the NFT, or combinations thereof.

An important problem in HAMR transducer technology is recession of the NFT which can occur upon exposure to the elevated temperatures experienced through transducer operation (typically 200° C. to 450° C.). Several mechanisms of mass transfer may be operative in these phenomena. These may include those known in metallurgy to be responsible for grain boundary migration or grain growth. Other phenomena which may be driving thermomechanical distortion of the NFT result from the size (i.e., nanoscale) of the transducer component in HAMR.

A specific example of such other phenomena is the effect of surface stress. Surface stress links the bonding configuration at an interfacial region with macroscopic characteristics and is known to be operative in many surface phenomena, e.g. surface reconstruction. Surface stress originates from the redistribution of charge density due to the different co-ordination of surface atoms to those in the bulk of the material. As such, the nature of the chemical bonding and the equilibrium interatomic distances at the surface are different from that inside the bulk. Surface atoms experience less attractive interaction forces from their surroundings than do atoms in the bulk. As a consequence, surface atoms experience a net force towards the inside of the bulk resulting in a surface stress. For mechanical equilibrium, surface stresses must be balanced by corresponding bulk stresses. In nanoscale objects surface induced bulk stresses may even exceed the theoretical yield stress of the material. Such large forces may drive surface, bulk and grain boundary vacancy migration that could produce "creep-like" effects possibly resulting in volumetric distortion of the NFT transducer.

To mitigate NFT recession it may be desired that the first interfacial structure or transducer interfacial structure function to suppress or reduce the atom and/or defect mobility or diffusion of certain components of the transducer structure (e.g., the gold atoms/vacancies of an NFT structure). Reducing or suppressing surface, interfacial, or bulk mobility of atoms or defects (e.g. point defects such as vacancies or interstitials or line defects such as dislocations); reducing or suppressing the grain boundary migration velocity; altering the interfacial surface free energy; or combination thereof to act to reduce or suppress NFT recession or protrusion may be characteristics desired in a first interfacial structure.

For suppressing or reducing transducer surface atom mobility, e.g. of the plasmonic materials of the NFT (e.g. Au) a first interfacial structure of metal atoms may be used. In some embodiments, metals such as chromium (Cr), platinum (Pt), copper (Cu), aluminum (Al), nickel (Ni), or combinations thereof may be used. In some embodiments, oxide layers may be used to suppress interfacial defect mobility. In some embodiments, oxides such as SiOx, or AgOx for example may also be used to suppress interfacial defect mobility. Non-stoichiometric oxides with dangling, free, unterminated bonds may also be particularly beneficial. In some embodiments, metal and metal oxide film bilayers may be used to interfacially engineer the transducer interfacial structure. Such layers may have thicknesses that are referred to as ultrathin, for example not greater than 2 Å. Controlling surface migration effects can be important since surface/interfacial diffusion processes are much faster than bulk diffusive processes. Furthermore, the surface concentration of defects (that can aid surface atom mobility) are much greater than typical bulk defect concentrations. Surfaces can also act as sinks for migrating defects.

Suppression or reduction of NFT recession or protrusion may also be accomplished through the combination of control of atom and/or defect mobility through both interfacial mechanisms as well as other effects. One such effect that may be utilized is referred to herein as "microalloying". Such an effect can be described as a "bulk" effect as opposed to an interface effect. Reduction or suppression of the grain boundary migration velocity of certain materials may be achieved by microalloying. As used herein, microalloying impurity (or dopant) concentrations refer to impurity (or dopant) additions of not greater than 200 ppm (0.02%); and in some embodiments not greater than 100 ppm (0.01%). These microalloying impurity amounts refer to the amount of the microalloying dopant in the material whose recession or protrusion is desired to be suppressed or reduced. For example therefore, these microalloying impurity amounts refer to the amount of the microalloying dopant in the NFT material.

Such levels in the NFT material may be able to reduce grain boundary migration effects in the NFT's plasmonic materials. Exemplary plasmonic materials that can be utilized, for example in NFTs can include, for example gold (Au) silver (Ag), copper (Cu), aluminum (Al), or alloys thereof. Exemplary plasmonic materials can also include indium tin oxide (ITO), aluminum zinc oxide (AZO), gallium zinc oxide (GZO), or titanium nitride (TiN), for example. Exemplary alloys of Au, Ag, Cu, and Al can include, for example Au alloyed with cadmium (Cd), or zinc (Zn).

Microalloying may be beneficial because the extremely low concentrations of dopant elements should have little degrading effect on the plasmonic performance of the NFT material. In contrast, previous alloys utilized components at levels of at least 0.5% in the NFT material and in some instances from 0.5% to 5% in the NFT material.

In some embodiments, where the plasmonic material of the NFT (i.e., the underlying structure or the underlying transducer structure) comprises gold (Au) or a gold alloy; microalloying dopants can include, for example rare earth elements, alkaline earth metals, or alkali metals. Specific examples of such dopants can include, for example, beryllium (Be), calcium (Ca), lithium (Li), magnesium (Mg), strontium (Sr), sodium (Na), potassium (K), cerium (Ce), lanthanum (La), neodymium (Nd), and gadolinium (Gd). In some embodiments, dopants can include, for example beryllium (Be), calcium (Ca), lithium (Li), magnesium (Mg), or combinations thereof.

The effects of microalloying have also been shown to be isochronous with recrystallization effects in NFT materials such as gold. The recrystallization temperature of gold (and therefore kinetics) increases from about 112° C. for 99.999% pure gold to about 160° C. for 99.99% gold to greater than 200° C. for 99.9% gold. Therefore microalloying effects may readily be induced at expected NFT temperatures or be induced through relatively low temperature benign processing. The low concentrations utilized herein (100 ppm=0.01%) also aid the viability of a low temperature, short duration, low intrusive processing technique, (e.g. low temperature thermal diffusion), to suppress grain boundary migration or NFT recession or protrusion effects.

In some embodiments where the plasmonic material of the NFT (i.e., the underlying structure or the underlying transducer structure) comprises something other than gold, other microalloying dopants could be utilized. For example, in some embodiments in which a NFT may be made of silver (Ag) or a silver alloy, exemplary microalloying dopants could include, for example manganese (Mn) and zinc (Zn).

Microalloying may be utilized in two distinct fashions. The first includes forming a microalloyed NFT, i.e., a NFT which includes a microalloy dopant and a plasmonic material (which can also be referred to as a non-microalloy dopant material). This concept is discussed in commonly assigned and concurrently filed U.S. patent application Ser. No. 13/923,922, entitled "MAGNETIC DEVICES INCLUDING NEAR FIELD TRANSDUCER", filed herewith naming Philip Pitcher and Sami Antrazi as inventors (the disclosure of this application is incorporated herein by reference thereto to the extent it does not contradict the current disclosure). A microalloyed NFT can be formed either by fabricating a NFT that includes plasmonic material (s) and one or more microalloy dopants or by forming a microalloy dopant containing layer on the NFT and allowing the microalloy dopants to diffuse into the NFT material. The second method can be undertaken by utilizing a first interfacial structure that includes one or more microalloy dopants.

The first interfacial structure or more specifically the transducer interfacial structure may be used (in such embodiments) to suppress or reduce the grain boundary migration (velocity) of certain materials forming the NFT (i.e., plasmonic materials) through supplying microalloying components to the plasmonically active materials forming the NFT through interdiffusive effects. A suitably thin layer of microalloying materials or a layer containing microalloying materials and other materials situated at the interface of the first interfacial structure and the transducer surface can institute this effect. Interdiffusion of the microalloying components into the plasmonic materials of the NFT may be achieved through heating the structure in a furnace, by laser, or by e-beam for example. The natural thermal heating during operation of the NFT may also prove sufficient to induce the microalloying effect. Microalloying components could also be introduced during transducer device fabrication through using suitably doped sputtering targets, evaporator charges, or through ion implantation, for example. It should be noted that in such targets, the microalloying dopants may have concentrations that are at least the same as or higher than those desired in the final first interfacial structure.

Disclosed first interfacial structures can include at least one or more microalloy dopants (such as those disclosed above). Some disclosed interfacial structures can include at least one microalloy dopant and one or more non-microalloy dopant materials. In some embodiments, the non-microalloy dopant material can include metals, for example, a first interfacial structure could include one or more microalloy dopants and copper (Cu) for example. In some embodiments (where the associated NFT is made of gold or a gold alloy), a first interfacial structure could include beryllium (Be) and copper (Cu). A first interfacial structure that includes copper, for example, could be advantageous because copper forms a relatively strong bond with gold (an exemplary material of the underlying NFT), thereby providing a layer over the NFT that would be strongly bonded to the NFT. In some embodiments, a first interfacial structure that includes both microalloy dopant materials and non-microalloy dopant materials can have concentrations of the microalloy dopant materials that are at a level that is sufficient to obtain desired levels of the microalloy dopant material in the NFT material. In some embodiments, a first interfacial structure that includes both microalloy dopant materials and non-microalloy dopant materials can have concentrations of the microalloy dopant materials that are at a level that is sufficient to obtain not greater than 200 ppm in the NFT, for example. In some embodiments, a first interfacial structure that includes both microalloy dopant materials and non-microalloy dopant materials can have concentrations of the microalloy dopant materials that are at a level that is sufficient to obtain not greater than 100 ppm in the NFT, for example. In some embodiments, a first interfacial structure that includes both microalloy dopant materials and non-microalloy dopant materials can have concentrations of the microalloy dopant materials that can be 1% or less, for example. In some embodiments, a first interfacial structure that includes both microalloy dopant materials and non-microalloy dopant materials can have concentrations of the microalloy dopant materials that can be 0.5% or less, for example.

Disclosed first interfacial structures (or more specifically disclosed transducer interfacial structures) can exist in a non-interdiffused state and a diffused state. This distinction recognizes whether or not the microalloy dopant materials of the first interfacial structure have diffused into the NFT or not. Disclosed herein are devices including a first interfacial structure that includes one or more microalloy dopants, where the microalloy dopants have not interdiffused into the NFT. Also disclosed herein are devices including a first interfacial structure that includes one or more microalloy dopants, where the microalloy dopants have at least begun to interdiffuse into the NFT.

The effects of surface stress may also be mitigated by application of an electric field or interfacial electric charge.

The effects of surface stress may also be mitigated by application of a counter interfacial stress in an adjacent interfacial layer.

In some embodiments the first interfacial structure may include a metal or more than one type of metal. In such embodiments, metal atom(s) of the first interfacial structure may be described as being bonded to the top portion or top layer of an underlying structure. Stated another way, the metal atoms of the first interfacial structure may be described as being bonded to atoms, compounds, or both, of the underlying structure. In some embodiments where the underlying structure includes metal atoms (and optionally additional metals, compounds or both), the metal atoms of the first interfacial structure may be bonded to the metal atoms of the underlying structure. In some embodiments where the magnetic structure includes compounds, such as oxides or nitrides (and optionally additional compounds, metals, or both), the metal atoms of the first interfacial structure may be bonded to the oxides in the underlying structure.

It is thought, but not relied upon that the first interfacial structure may strongly contribute to the ability of the film structure to increase or enhance adhesion of one external structure to another. In some embodiments, a particular metal may be chosen based at least in part, on its ability to adhere to, or covalently bond via the first interfacial structure, with atoms or compounds present in an underlying structure. The relevant materials in the underlying structure can depend at least in part on the identity and function of the underlying structure. In some embodiments, where the underlying structure is a magnetic transducer, the magnetic structure could include FeCo, NiFe, Cr, $AlO_x$, $TaO_x$, $SiO_x$, Au, or combinations thereof. In such an embodiment then, a particular metal could be chosen based on an ability to bond to one or more of those materials.

In some embodiments, a particular metal is chosen based on its affinity for oxygen. In some embodiments, a metal that is chosen for use in a first interfacial structure may have a relatively low affinity for oxygen. Such a metal may, but need not have self-limiting, with respect to the extent of oxidation, oxide growth. Such a metal could provide a structure in which, even if oxygen reached the layer, the metal would oxidize and effectively stop the oxygen from permeating any further. The metal could function in this way to prevent oxygen migration from either direction. The appropriate level of oxygen affinity, which causes the self-limiting effect, may also allow the formation of a first interfacial structure that maintains an un-oxidized metal as the bottom of the first interfacial structure that contributes to the ability of the layer to simultaneously enhance adherence and prevent diffusion.

In some embodiments, a particular metal is chosen based, at least in part, on the ability of the oxide (or oxides) of the metal to stop or limit the permeability of oxygen. Such a property can be useful in order to maintain an un-oxidized metal as the bottom of the first interfacial structure, which could contribute to the ability of the layer to simultaneously enhance adherence and prevent diffusion.

In some embodiments, the first interfacial structure can have a thickness that renders it electrically non-conductive. In some embodiments, where it is desired that the film structure as a whole is electrically non-conductive, the first interfacial structure can be of a thickness that renders it and thereby the entire film structure electrically non-conductive. Electrically non-conductive, as used herein in the context of the film structure implies that the first interfacial structure or the film structure is electrically resistive enough that magnetic component(s) of an underlying structure have their operational characteristics enabled. In some embodiments, the first interfacial structure can have a thickness as thin as a partial or full monolayer of atoms. In some embodiments, the first interfacial structure can have a thickness as thin as a monolayer or partial monolayer of atoms. In some embodiments, the first interfacial structure can have a thickness as thin as 2 Å. In some embodiments, the first interfacial structure can have a thickness as thin as 3 Å. In some embodiments, the first interfacial structure can have a thickness as thin as 5 Å. In some embodiments, the first interfacial structure can have a thickness as thick as 10 Å. In some embodiments, the first interfacial structure can have a thickness as thick as 20 Å. In some embodiments, the first interfacial structure can have a thickness as thick as 50 Å.

Deposition of the First Interfacial Structure

As with any and all portions of disclosed film structures, various methods or processes can be utilized to form disclosed layers. Specific examples of deposition techniques which can be utilized to form disclosed portions of film structures (such as first interfacial structures) can include filtered cathodic arc (FCA) techniques, surface sub-plantation techniques, and other known techniques. Exemplary surface sub-plantation techniques can be found, for example, in commonly assigned U.S. patent application Ser. Nos. 13/440,068; 13/440,071; and 13/440,073.

Deposition of metallic layers of a few angstroms is performed regularly in non-oxide multilayers, however it can become a non-trivial task when in an oxide environment. Deposition of an ultrathin (for example not greater than 30 Å) metallic layer followed by deposition of an oxide can cause the oxygen to react with the metallic layer thereby oxidizing it. This oxidation may render the initial metallic layer nonmetallic and may also oxidize the surface it was meant to protect. Furthermore, such oxidation of the metallic layer could also create an oxide gradient.

In some embodiments, a process such as those described below can be utilized in place of more commonly utilized schemes that may be accompanied by the above noted disadvantages.

One type of such methods can include a step prior to depositing the metallic layer. The step includes flooding the vacuum chamber with oxygen in order to oxidize the environment, thereby ensuring that the oxygen introduced during the film oxidation phase will be mostly available for the film. In order to maintain the metallic layer at a desired thickness a thicker metal film than the final desired thickness can be deposited. Then, all processing is stopped and oxygen is introduced at a fixed flow rate for a fixed duration. Upon completion of the oxidation the remaining oxide can be deposited without disturbing the metallic interface layer.

In some embodiments, a thicker metallic layer can be deposited and then an oxide layer can be deposited, which will oxidize the metal layer. Such methods may be less reliable and repeatable due to variation in oxygen partial pressure and the oxide deposition rate, which is material dependent.

When using non self-limiting metals such as Ni, a gradient from the oxidized layer to the metallic layer will not be present. This can be seen, for example, by the slow change in sheet resistance of the metal versus large jumps when using self-limiting metals.

In some embodiments, the first interfacial structure can include one or more than one layer that includes oxides with dangling bonds. In such interface layers, a non-stoichiometric layer can be deposited from either a metallic or oxide target. When depositing from a metallic target, at least three different control strategies could be utilized: time, power and gas flow rate; residual gas analyzer (RGA) to measure the oxygen partial pressure; or a crystal deposition rate monitor.

In embodiments where a time, power, and gas flow rate control technique with a metal target is utilized, an ion source (for example an ion beam or a plasma based beam) could be ran at a fixed output and a large amount of oxygen could be flowed for a fixed duration. This could oxidize the entire chamber and thus the vacuum environment will be at a known and reproducible state. Then, the oxygen flow rate is dropped to below what is needed to deposit a fully stoichiometric film. This gas flow rate is ran until it is thought that all remaining free oxygen in the vacuum chamber has been consumed. At which point the sample is exposed to the sputter flux and the thin film can be deposited. Since the deposition time is fairly short the continuous drop in oxygen partial pressure in the vacuum chamber will cause a non-uniform stoichiometric film to be deposited. Since the deposition time is so short this will have a small effect on the film.

In some embodiments where a RGA control technique with a metal target is to be utilized, an ion source (for example an ion beam or a plasma based beam) could be ran at a fixed output and a large amount of oxygen could be flowed for a fixed duration. This will oxidize the entire chamber and thus the vacuum environment will be at a known and reproducible state. The oxygen flow rate is then dropped to below what is needed to deposit a fully stoichiometric film. The gas flow would then be maintained at this rate until the desired partial pressure of oxygen is attained, at which point either the film can be deposited or oxygen can be introduced to control the partial pressure of oxygen prior to deposition. In a closed loop control of the partial pressure the film will be stoichiometrically uniform throughout the film thickness. In addition, the system could be capable of accurately controlling the film properties. In methods where the oxygen partial pressure is waited for, without active control, the system could have a better repeatability than the simple time, power, flow method but the film will have more stoichiometric variation during growth.

In some embodiments where a Crystal Rate Monitor control technique with a metal target is utilized, an ion source (for example an ion beam or a plasma based beam) could be ran at a fixed output and a large amount of oxygen could be flowed for a fixed duration. This could oxidize the entire chamber and thus the vacuum environment will be at a known and reproducible state. Then the oxygen flow rate would be dropped to below what is needed to deposit a fully stoichiometric film. This gas flow rate would be maintained until a predetermined deposition rate was attained, at which point the thin film could be deposited or oxygen could be introduced and the deposition rate could be controlled prior to beginning deposition. In the closed loop control of the deposition rate the film will be stoichiometrically uniform throughout the film thickness. In addition, the system could be capable of accurately controlling the film properties. In the wait for deposition rate method without active control, the system could have a better repeatability than the simple time, power, flow method but the film could have more stoichiometric variation during growth.

When depositing from an oxide target, one exemplary control scheme utilizes time, power, and gas flow. Such techniques could include running an ion source (for example an ion beam based beam) at a fixed output and sputtering for an extended duration from a metallic target in order to getter all oxygen in the vacuum chamber. This could enable oxygen to be gettered from the oxide target while it is sputtering in order to produce a non-fully stoichiometric film. Using this method and the RGA can ensure that the oxygen partial pressure is low enough to start depositing the oxide. The oxygen partial pressure will then spike during oxide sputter but start to decline with time at which point deposition can be begun. A quartz crystal monitor could also be used to determine when the desired rate is attained.

Second Interfacial Structure

FIG. 1 also depicts a second interfacial structure 115. The second interfacial structure 115 is positioned, in the depiction of FIG. 1, on the top of the film structure 100. The second interfacial structure 115 can be composed of a single individual film or can include more than one single individual film. The second interfacial structure 115 can be designed to promote desired characteristics of an overlying structure or overlying structures. In some embodiments where the film structure is positioned adjacent an overcoat, the second interfacial structure can also be referred to as an overcoat interfacial structure. The overcoat interfacial structure can generally be positioned adjacent to, directly adjacent to, in contact with, or directly underneath the overcoat layer.

The second interfacial structure 115 can include metal or metals, oxides of a metal or metals, nitrides of a metal or metals, or any combination thereof. The particular metal utilized for disclosed second interfacial structures can be chosen based, at least in part on desired properties of the second interfacial structure or the film structure as a whole.

In some embodiments, a second interfacial structure can have a thickness from 2 Å to 50 Å. In some embodiments, a second interfacial structure can have a thickness from 2 Å to 30 Å. In some embodiments, a second interfacial structure can have a thickness from 3 Å to 25 Å. In some embodiments, a second interfacial structure can have a thickness from 5 Å to 20 Å.

In some embodiments, a particular metal can be chosen based, at least in part, on its effectiveness as a substrate for additional processing that may be occurring on the article. For example, the particular metal may be chosen, at least in part, on its effectiveness as a substrate for depositing the overcoat layer. In some embodiments, the overcoat layer or other layers may be formed using surface sub-plantation techniques, for example. In such embodiments, the particular metal chosen could advantageously be a material that provides an effective surface upon which to form an overcoat layer using surface sub-plantation techniques.

In some embodiments, a particular metal may be chosen based, at least in part, on the ability of it to advantageously affect at least one property of a layer that is being formed over or on it. For example, the particular metal may be chosen, at least in part, on its ability to positively affect an overcoat layer deposited thereon. In some embodiments, the overcoat layer (or other layers) may be formed using surface sub-plantation techniques, for example. In such embodiments, the particular metal chosen could advantageously be a material that has an ability to positively affect mechanical attributes of the overcoat layer formed thereon. Examples of advantageous properties can include, for example mechanical properties such as prevention of mechanical delamination (often described as "crinking", "buckling", or "wrinkling") of the overlying overcoat layer.

Exemplary second interfacial structures can generally include metal atoms, oxides, or nitrides of metal(s) atoms, bonded to atoms or compounds of an adjacent overcoat layer, for example. The second interfacial structure may, thereby contribute to the ability of the film structure to act to enhance or increase the adherence of an external structure to another (in this case assist in the adherence of the overcoat layer). Additionally, the second interfacial structure may, but need not, contribute to the ability of the film structure to act as a diffusion barrier.

In some embodiments, a particular metal may be chosen based, at least in part, on the ability of the oxide (or oxides) of the metal to stop or limit the permeability of oxygen. Such a property can be useful in order to allow the formation of a lower un-oxidized layer of the second interfacial structure, or more specifically, maintains an un-oxidized metal on the bottom interface of the second interfacial structure (i.e. the interface opposite to that in contact with the overcoat). This could contribute to the ability of the layer to simultaneously enhance adherence and prevent diffusion.

In some embodiments, a particular metal can also be chosen, based at least in part, on the ability of the oxide (or oxides) of the metal, or the metal itself to stop or limit the permeability of water. Preventing or minimizing water permeability can be important in preventing or minimizing corrosion that may occur because of the presence of water.

In some embodiments, a particular metal may be chosen based on its affinity for oxygen. In some embodiments, a metal that may be chosen for use in a second interfacial structure may desirably have a relatively low affinity for oxygen. Such a metal may, but need not have self-limiting, with respect to the extent of oxidation, oxide growth. The appropriate level of oxygen affinity, which causes the self-limiting effect, may allow the formation of the multilayer structure of the layer, or more specifically, maintain an un-oxidized metal layer on the bottom of the second interfacial structure that contributes to the ability of the layer to simultaneously enhance adherence and prevent diffusion.

In some embodiments, a particular metal is chosen based, at least in part, on the ability of the metal to dissipate electrical charge. In some embodiments, an overcoat interfacial structure can include chromium (Cr), aluminum (Al), hafnium (Hf) or a combination thereof (for example perhaps in multiple layers or an alloy). In some embodiments, an overcoat interfacial structure can include chromium.

As with any and all portions of disclosed film structures, various methods or processes can be utilized to form disclosed layers. Specific examples of deposition techniques which can be utilized to form disclosed portions of film structures (such as second interfacial structures) can include, for example, filtered cathodic arc (FCA) techniques, surface sub-plantation techniques, and other known techniques. Exemplary surface sub-plantation techniques can be found, for example, in commonly assigned U.S. patent application Ser. Nos. 13/440,068; 13/440,071; and 13/440,073.

Intermediate Structure

FIG. 1 also depicts an intermediate structure 110. The intermediate structure 110 is positioned, in the depiction of FIG. 1, in the middle of the film structure 100, or between the first interfacial structure 105 and the second interfacial structure 115. The intermediate structure 110 can be composed of a single individual film or can include more than one single individual film. The intermediate structure 110 can be designed to achieve compatibility between the over- and underlying structures, achieve compatibility between the first and second interfacial structures, contribute intrinsic functionality and characteristics, or combinations thereof.

In some embodiments, an intermediate structure can have a thickness from 2 Å to 70 Å. In some embodiments, an intermediate structure can have a thickness from 2 Å to 50 Å. In some embodiments, an intermediate structure can have a thickness from 3 Å to 30 Å. In some embodiments, an intermediate structure can have a thickness from 5 Å to 15 Å.

In some embodiments where the film structure 110 is positioned between an overcoat layer and a transducer structure, the intermediate structure can be designed to achieve compatibility between the overcoat and the transducer, achieve compatibility between the overcoat interfacial structure and the transducer interfacial structure, contribute thermal and optical property management of the overall film structure, enhance adhesion, act as a diffusion barrier, or combinations thereof.

The intermediate structure 110 can include metal or metals, oxides of a metal or metals, nitrides of a metal or metals, or combinations thereof. The intermediate structure may include atoms of an elemental material (or materials), oxides or nitrides of the material or materials, or combinations thereof. In some embodiments, an intermediate structure includes only one kind of atoms, and therefore only one kind of oxides (disregarding the ability to have different oxidation states and therefore different number of oxygen atoms in an oxide) or nitrides. In some embodiments, an intermediate structure includes more than one kind of atoms, and therefore more than one kind of oxides (as well as the ability to have different oxidation states and therefore different number of oxygen atoms in an oxide) or nitrides.

The intermediate structure, which can also be described as a layer or layers not directly interfacing with an overlying structure (for example an overcoat structure) or underlying structure (for example a transducer structure) can typically be utilized for thermal and optical management of the film structure. In some instances an intermediate structure may also have a multifunctional role.

In some embodiments, a particular metal, oxide or nitride may be chosen based, at least in part, on the ability of the oxide (or oxides) of the metal to be optically transparent at a relevant wavelength (for example the visible (VIS), near infrared (NIR) or ultraviolet (UV) range). In addition, the particular metal, oxide or nitride may have a low optical absorption. This could serve to minimize the amount of heat absorbed when energy of the relevant wavelength passes thought it, thereby minimizing the amount of heat energy produced by the intermediate structure.

In some embodiments, a particular metal, oxide or nitride is chosen based, at least in part, on the ability of the oxide (or oxides) of the metal to have a high thermal conductivity and specific heat. The particular metal, oxide or nitride may allow heat energy to be absorbed and transferred away from a relevant surface of an underlying structure (for example a magnetic surface), thereby keeping the underlying structure from reaching elevated temperatures, thus performing the function of a heat sink.

As with any and all portions of disclosed film structures, various methods or processes can be utilized to form disclosed layers. Specific examples of deposition techniques which can be utilized to form disclosed portions of film structures (such as intermediate structures) can include, for example, filtered cathodic arc (FCA) techniques, surface sub-plantation techniques, and other known techniques. Exemplary surface sub-plantation techniques can be found, for example, in commonly assigned U.S. patent application Ser. Nos. 13/440,068; 13/440,071; and 13/440,073.

Disclosed film structures may also be combined with other techniques designed to provide various benefits. For example, disclosed film structures may be utilized with further techniques designed to reduce or suppress the recession of the NFT, an example of such include those described in concurrently filed U.S. patent application Ser. No. 13/923,922, entitled "MAGNETIC DEVICES INCLUDING NEAR FIELD TRANSDUCER", filed herewith naming Philip Pitcher and Sami Antrazi; and U.S. patent application Ser. No. 13/798,469, entitled ARTICLES INCLUDING INTERMEDIATE LAYER AND METHODS OF FORMING; the disclosures of which are incorporated herein by reference thereto to the extent they do not contradict the current disclosure.

EXAMPLES

FIG. 3A shows one exemplary embodiment of a disclosed apparatus. The apparatus 300 includes an overlying structure, or an overcoat 302, an underlying structure or a transducer structure 306 and a film structure 301. The film structure 301 can include an overcoat interfacial structure 303, an intermediate structure 304 and a transducer structure 305. In such particular embodiments, the overcoat interfacial structure 303 can include a single layer of a metal that has a thickness that is not greater than 20 Å; or more specifically it can be a 16 Å layer of chromium (Cr). In such particular embodiments, the intermediate structure 304 can include a single layer of a metal oxide that has a thickness that is not greater than 75 Å; or more specifically it can be a 30 Å layer of tantalum oxide (TaOx). In such particular embodiments, the transducer interfacial structure 305 can include a single layer of a metal that has a thickness that is not greater than 20 Å; or more specifically it can be a 16 Å layer of chromium (Cr).

Apparatuses including a transducer structure having a 400 Å cobalt iron (CoFe) layer; a 16 Å chromium transducer interfacial structure; a 30 Å tantalum oxide intermediate structure; a 16 Å chromium overcoat interfacial structure; and a 22 Å carbon overcoat structure were fabricated. The apparatuses were baked at either 250° C. or 300° C. for 24 hours in a standard air environment. The apparatuses showed no change in wear performance even after exposure, as seen in Table 1 below.

TABLE 1

| Anneal Temperature (° C.) | COF | Weibull Characteristic Life | Run #1 | Run #2 | Run #3 | Run #4 |
| --- | --- | --- | --- | --- | --- | --- |
| 250 | 0.158 | 7175 | 7200 | 7175 | 7150 | — |
| 300 | 0.140 | 7162 | 7200 | 7175 | 7150 | 7125 |

Figure 3B:
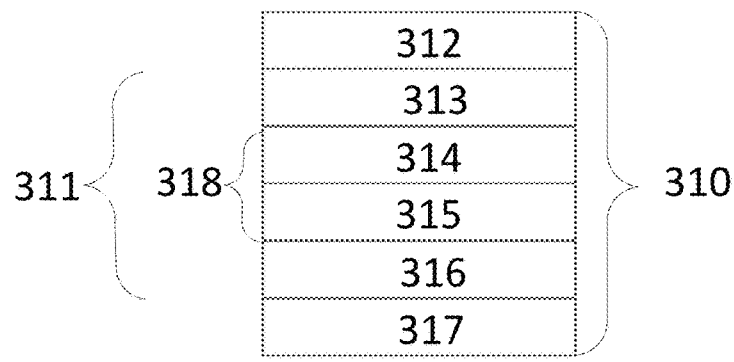

FIG. 3B shows another exemplary embodiment of disclosed apparatuses. The apparatus 310 includes an overlying structure, or an overcoat 312, an underlying structure or a transducer structure 317 and a film structure 311. The film structure 311 can include an overcoat interfacial structure 313, an intermediate structure 318 and a transducer interfacial structure 316. In such particular embodiments, the overcoat interfacial structure 313 can include a single layer of a metal that has a thickness that is not greater than 10 Å; or more specifically it can be a layer of chromium (Cr). In such particular embodiments, the transducer interfacial structure 316 can include a single layer of a metal that has a thickness that is not greater than 10 Å; or more specifically it can be a layer of chromium (Cr). In such particular embodiments, the intermediate structure 318 can itself include more than one layer, for example it can include a first intermediate layer 315 and a second intermediate layer 314. In such particular embodiments, the first intermediate layer 315 can include a layer of a metal oxide that has a thickness that is not greater than 75 Å; or more specifically it can be a layer of a metal oxide including the metal that is in the transducer interfacial structure 316, in such particular embodiments, chromium oxide (CrOx). In such particular embodiments, the second intermediate layer 314 can include a layer of a metal oxide that has a thickness that is not greater than 75 Å; or more specifically it can be a layer of a metal oxide that may not include the metal that is in the transducer interfacial structure 316, for example it could include tantalum oxide (TaOx).

Figure 3C:
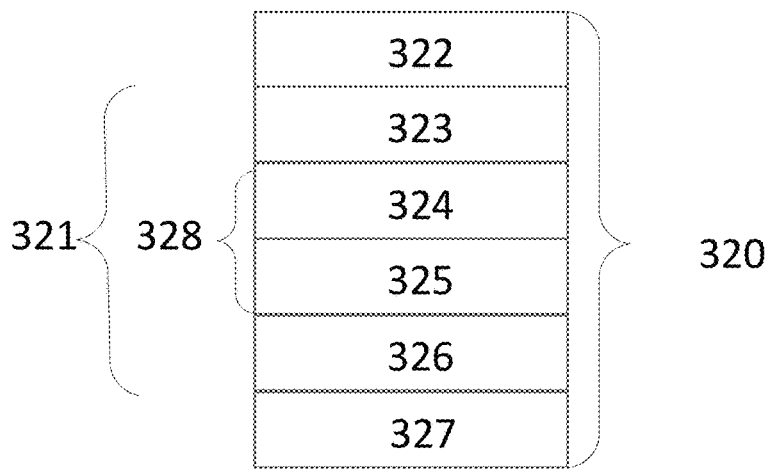

FIG. 3C shows another exemplary embodiment of disclosed apparatuses. The apparatus 320 includes an overlying structure, or an overcoat 322, an underlying structure or a transducer structure 327 and a film structure 321. The film structure 321 can include an overcoat interfacial structure 323, an intermediate structure 328 and a transducer interfacial structure 326. In such particular embodiments, the overcoat interfacial structure 323 can include a single layer of a metal that has a thickness that is not greater than 10 Å; or more specifically it can be a layer of chromium (Cr). In such particular embodiments, the transducer interfacial structure 326 can include a single layer of an oxide that has a thickness that is not greater than 75 Å; or more specifically it can be a layer of silicon oxide (SiOx). In such particular embodiments, the intermediate structure 328 can itself include more than one layer, for example it can include a first intermediate layer 325 and a second intermediate layer 324. In such particular embodiments, the first intermediate layer 325 can include a layer of a metal that has a thickness that is not greater than 10 Å; or more specifically it can be a layer of a metal that is the same as the overcoat interfacial structure 323, in such particular embodiments, chromium (Cr). In such particular embodiments, the second intermediate layer 324 can include a layer of a metal oxide that has a thickness that is not greater than 75 Å; or more specifically it can be a layer of a metal oxide that may include the metal that is in the overcoat interfacial structure 323, for example it could include chromium (Cr).

Figure 3D:
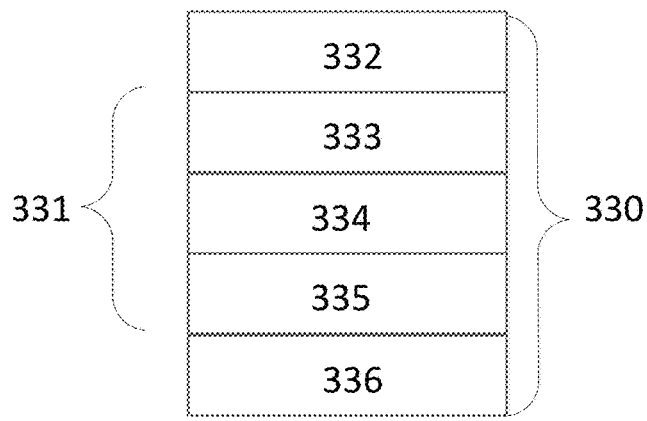

FIG. 3D shows another exemplary embodiment of disclosed apparatuses. The apparatus 330 includes an overlying structure, or an overcoat 332, an underlying structure or a transducer structure 336 and a film structure 331. The film structure 331 can include an overcoat interfacial structure 333, an intermediate structure 334 and a transducer interfacial structure 335. In such particular embodiments, the overcoat interfacial structure 333 can include a single layer of a metal that has a thickness that is not greater than 10 Å; or more specifically it can be a layer of chromium (Cr). In such particular embodiments, the intermediate structure 334 can include a single layer of a metal oxide that is not greater than 75 Å. In such particular embodiments, the intermediate structure 334 can include a layer of a metal oxide that may not include the metal that is in the transducer interfacial structure 335 or the overcoat interfacial structure 333, for example it could include tantalum oxide (TaOx). In such particular embodiments, the transducer interfacial structure 335 can include a single layer of an oxide that has a thickness that is not greater than 75 Å; or more specifically it can be a layer of silicon oxide (SiOx). In embodiments such as those depicted in FIG. 3D, the metals within the metal or metal oxide layers of the various layers of the film structure can be entirely different, as opposed to situations where some of the layers include the same metals (either as metals or metal oxides).

Figure 3E:
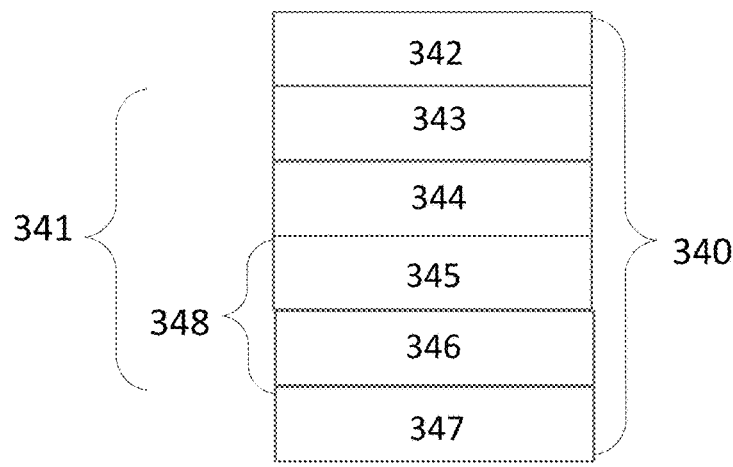

FIG. 3E shows another exemplary embodiment of disclosed apparatuses. The apparatus 340 includes an overlying structure, or an overcoat 342, an underlying structure or a transducer structure 347 and a film structure 341. The film structure 341 can include an overcoat interfacial structure 343, an intermediate structure 344 and a transducer interfacial structure 348. In such particular embodiments, the overcoat interfacial structure 343 can include a single layer of a metal that has a thickness that is not greater than 10 Å; or more specifically it can be a layer of chromium (Cr). In such particular embodiments, the intermediate structure 344 can include a single layer of an oxide that has a thickness of not greater than 75 Å; or more specifically it can be silicon oxide (SiOx). In such particular embodiments, the metal of the intermediate structure 344 oxide can be different than that of the overcoat interfacial structure 343. In such particular embodiments, the transducer interfacial structure 348 can include a first transducer interfacial structure layer 346 and a second transducer interfacial structure layer 345. In such particular embodiments, the first transducer interfacial layer 346 can include a layer of a metal that has a thickness that is not greater than 10 Å; in some particular embodiments, the first transducer interfacial structure layer 346 can include copper (Cu). In such particular embodiments, the second transducer interfacial layer 345 can include a layer of a metal or a metal alloy that has a thickness that is not greater than 10 Å. In some embodiments the second transducer interfacial structure layer 345 can include a metal alloy that includes the metal in the first transducer interfacial structure layer 346, for example the second transducer interfacial structure layer 345 can include a copper alloy such as a copper-aluminum (Cu—Al) alloy.

Figure 3F:
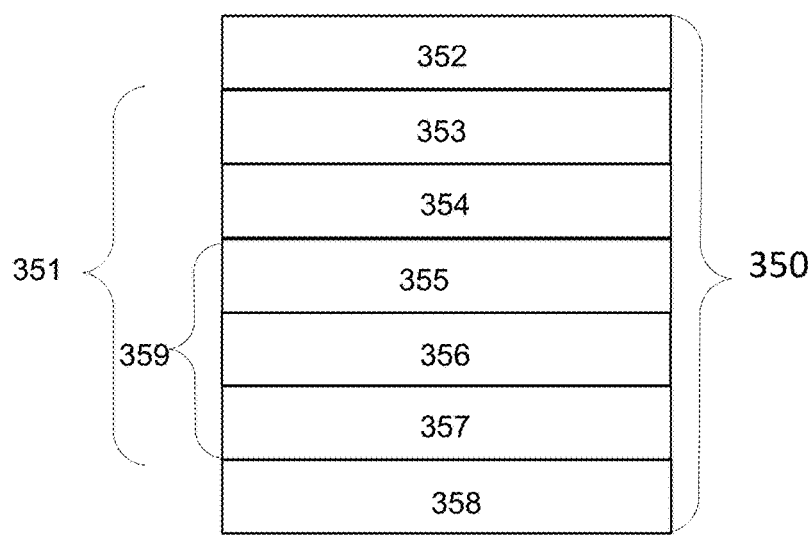

FIG. 3F exemplifies some more specific examples of disclosed articles. This article 350 includes an overcoat 352, a film structure 351, and a transducer 358. The film structure 351 can include an overcoat interfacial structure 353, an intermediate structure 354 and a transducer interfacial structure 359. The overcoat interfacial structure 353 can include a metal and can have a thickness of not greater than 10 Å; or in some embodiments, the overcoat interfacial structure 353 can be made of chromium (Cr) for example and have a thickness of a few angstroms (Å). The intermediate structure 354 can be a metal oxide for example and have a thickness of not greater than 75 Å.

The transducer interfacial structure 359 in such embodiments can include multiple layers. In the exemplified embodiment, it can include a first transducer interfacial structure layer 357, a second transducer interfacial structure layer 356 and a third transducer interfacial structure layer 355. One or more layers of the transducer interfacial structure 359 can include metals such as chromium (Cr), platinum (Pt), copper (Cu), aluminum (Al), nickel (Ni), or combinations thereof; oxide layers such as SiOx, or AgOx; non-stoichiometric oxides with dangling, free, un-terminated bonds may also be utilized. In particular embodiments, the first transducer interfacial structure layer 357 can include defect containing, or non-stoichiometric with dangling, free, un-terminated bonds, oxides; or more specifically defect containing, or non-stoichiometric with dangling, free, un-terminated silicon oxides (SiOx) having a thickness of not greater than 10 Å (for example from 3 Å to 10 Å). In particular embodiments, the second transducer interfacial structure layer 356 can include a stoichiometric oxide, such as for example silicon dioxide ($SiO_2$). In some embodiments, the second transducer interfacial structure layer 356 can have a thickness of not greater than 10 Å (for example from 3 Å to 10 Å). In particular embodiments, the third transducer interfacial structure layer 355 can include a metal; or more specifically chromium (Cr). In some embodiments, the third transducer interfacial structure layer 355 can have a thickness of not greater than 10 Å (for example only a few Å). The first and second transducer interfacial structure layers 357 and 356 can also be described as being a graded interface.

Figure 4A:
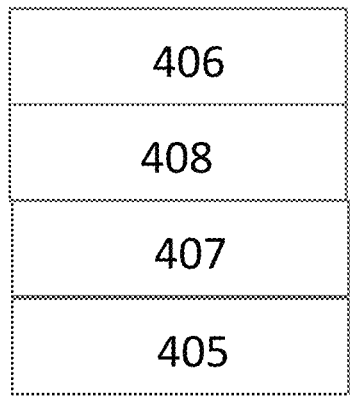
FIGS. 4A and 4B are schematic depictions of more specifically described exemplary articles.

FIG. 4A shows an example of an article including a transducer 405, an overcoat 406, a lower intermediate layer 407 and an upper intermediate layer 408. The lower intermediate layer 407 in such embodiments can be made of an oxide, for example chromium oxide (CrOx) or tantalum oxide (TaOx) and can have a thickness of not greater than 75 Å. The upper intermediate layer 408 in such embodiments can be made of a metal, for example chromium (Cr) and can have a thickness of not greater than 10 Å. In some embodiments, the metal of the upper intermediate layer and the metal of the metal oxide of the lower intermediate layer can be the same; and in some embodiments they are different.

Figure 4B:
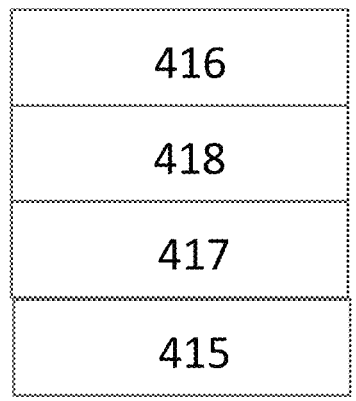

FIG. 4B shows an example of an article including a transducer 415, an overcoat 416, a lower intermediate layer 417 and an upper intermediate layer 418. The lower intermediate layer 417 in such embodiments can be made of a metal and can have a thickness of not greater than 10 Å. The upper intermediate layer 418 in such embodiments can be made of an oxide and can have a thickness of not greater than 75 Å. In some embodiments, the metal of the lower intermediate layer and the metal of the metal oxide of the upper intermediate layer can be the same; and in some embodiments they are different.

In some embodiments, an overcoat interfacial structure could include chromium (Cr) atoms, an intermediate structure could include a layer of chromium oxide ($CrO_x$) or Chromium Nitride, and a transducer interfacial structure could include Cr, $CrO_x$, Chromium Nitride or a combination thereof. Chromium may be an advantageous metal to include in film structures because it has a relatively low affinity for oxygen, adheres well to various atoms and/or compounds including specifically gold (Au); $CrO_x$ has a relatively low permeability to oxygen thereby making the oxidation self-limiting, thereby providing a good substrate upon which to utilize surface sub-plantation techniques; and demonstrates advantageous properties in overlying overcoats such as anti-wrinkling behavior.

Optical properties of film structures may also be relevant. FIGS. 5A and 5B show the optical transmission characteristics of various film structures as a function of wavelength (UV-VIS-NIR). The spectrums have been referenced to air, thereby removing the optical reflection component and leaving the absorption of the film structure as the primary cause for optical loss. As seen by these spectra, even using materials that are generally considered to have poor optical properties (high absorption such as metals, nitrides and some oxides), when used as they are in these film structures (in extremely thin layers) the overall film structure has a relatively low optical loss. This results in lower optical power being absorbed by the structure and converted to heat.

Thus, embodiments of magnetic devices including film structures are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A device comprising:
   a near field transducer (NFT), the NFT having a substrate adjacent surface and a second, opposing surface, the NFT comprising a plasmonic material;
   an overcoat;

a lower intermediate layer adjacent the NFT, the lower intermediate layer having a thickness not greater than 75 Å; and an upper intermediate layer adjacent the overcoat, the upper intermediate layer having a thickness not greater than 10 Å, wherein both the lower intermediate layer and the upper intermediate layer are positioned between the overcoat and the NFT.

2. The device according to claim 1, wherein the NFT comprises gold (Au), silver (Ag), copper (Cu), aluminum (Al), or alloys thereof.

3. The device according to claim 1, wherein the NFT comprises gold.

4. The device according to claim 1, wherein the lower intermediate layer comprises an oxide.

5. The device according to claim 4, wherein the lower intermediate layer comprises chromium oxide or tantalum oxide.

6. The device according to claim 1, wherein the upper intermediate layer comprises a metal.

7. The device according to claim 6, wherein the upper intermediate layer comprises chromium.

8. The device according to claim 1, wherein the lower intermediate layer and the upper intermediate layer comprise the same metallic element.

9. The device according to claim 1, wherein the lower intermediate layer and the upper intermediate layer comprise a different metallic element.

10. The device according to claim 4, wherein the lower intermediate layer comprises chromium oxide and the upper intermediate layer comprises chromium.

11. The device according to claim 1, wherein the overcoat comprises carbon.

12. The device according to claim 1, wherein the device further comprises a magnetic transducer.

13. A device comprising:
a near field transducer (NFT), the NFT having a substrate adjacent surface and a second, opposing surface, the NFT comprising a plasmonic material;
an overcoat;
a lower intermediate layer adjacent the NFT, the lower intermediate layer having a thickness not greater than 10 Å; and
an upper intermediate layer adjacent the overcoat, the upper intermediate layer having a thickness not greater than 75 Å,
wherein both the lower intermediate layer and the upper intermediate layer are positioned between the overcoat and the NFT.

14. The device according to claim 13, wherein the lower intermediate layer comprises a metal.

15. The device according to claim 14, wherein the lower intermediate layer comprises chromium.

16. The device according to claim 13, wherein the upper intermediate layer comprises a metal oxide.

17. The device according to claim 16, wherein the upper intermediate layer comprises chromium oxide.

18. The device according to claim 13, wherein the lower intermediate layer and the upper intermediate layer comprise the same metallic element.

19. The device according to claim 13, wherein the lower intermediate layer and the upper intermediate layer comprise a different metallic element.

* * * * *